United States Patent
Weng et al.

[11] Patent Number: 5,999,959
[45] Date of Patent: Dec. 7, 1999

[54] GALOIS FIELD MULTIPLIER

[75] Inventors: Lih-Jyh Weng, Needham; Ba-Zhong Shen; Diana Langer, both of Shrewsbury, all of Mass.

[73] Assignee: Quantum Corporation, Milpitas, Calif.

[21] Appl. No.: 09/025,419

[22] Filed: Feb. 18, 1998

[51] Int. Cl.$^6$ ........................................ G06F 7/00
[52] U.S. Cl. ................................................. 708/492
[58] Field of Search ........................ 708/492, 620, 708/625

[56] References Cited

U.S. PATENT DOCUMENTS

| | | | |
|---|---|---|---|
| 4,825,401 | 4/1989 | Ikumi ......................... | 708/625 |
| 4,989,168 | 1/1991 | Kuroda et al. ................ | 708/620 |
| 5,272,661 | 12/1993 | Raghavan et al. ............ | 708/492 |
| 5,586,070 | 12/1996 | Purcell ........................ | 708/620 |
| 5,764,558 | 6/1998 | Pearson et al. .............. | 708/625 |

*Primary Examiner*—Tan V. Mai
*Attorney, Agent, or Firm*—Cesari & McKenna, LLP

[57] ABSTRACT

A Galois field multiplier for $GF(2^n)$, with $n=2m$, multiplies two n-bit polynomials to produce $a(x)*b(x)=a(x)b(x) \bmod g(x)$, where $g(x)$ is a generator polynomial for the Galois field and "*" represents multiplication over the Galois field, by treating each polynomial as the sum of two m-bit polynomials:

$$a(x)=a_H(x)x^m+a_L(x) \text{ and } b(x)=b_H(x)x^m+b_L(x),$$

with $$a_H(x)x^m=[a_{n-1}x^{(n-1)-m}+a_{n-2}x^{(n-2)-m}+ \ldots +a_{m+1}x^{(m+1)-m}+a_m]x^m$$

$$a_L(x)=a_{m-1}x^{m-1}+a_{m-2}x^{m-2}+ \ldots +a_2x^2+a_1x+a_0$$

and $b_H$ and $b_L$ having corresponding terms. Multiplying the two polynomials then becomes:

$$a(x)*b(x)=(a_H(x)x^m+a_L(x))*(b_H(x)x^m+b_L(x))=[(a_H(x)b(x)_H)x^m \bmod g(x)$$

$$+(b_H(x)a_L(x)+a_L(x)b_L(x))]x^m \bmod g(x)+a_L(x)b_L(x).$$

The Galois field multiplier produces four degree-(n-2) polynomial products, namely, $a_H(x)b_H(x)=V_3$; $b_H(x)a_L(x)=V_2$; $a_H(x)b_L(x)=V_1$; and $a_L(x)b_L(x)=V_0$, in parallel in four m-bit polynomial multipliers. Next, a modulo subsystem multiplies $V_3$ by $x^m$ and performs a modulo $g(x)$ operation on the product $V_3x^m$ by treating $V_3$ as $V_{3H}x^m+V_{3L}$, with $V_{3H}$ including as a leading term $0x^{n-1}$. The modulo operation is performed by appropriately cyclically shifting $(m-(k-2))$ versions of an n-bit symbol that consists of the coefficients of $V_{3H}$ followed by m zeros, summing the results and adding the sum to an n-bit symbol that consists of the coefficients of $V_{3L}$, $V_{3H}$. The Galois field multiplier for $GF(2^n)$ with $n=2m+1$ operates in essentially the same manner, with $a_L$ and $b_L$ each including m+1 terms.

6 Claims, 3 Drawing Sheets

GALOIS FIELD MULTIPLIER

FIELD OF THE INVENTION

This invention relates generally to data processing systems and, more particularly, to systems that manipulate data codewords that are encoded using codes based on Galois fields.

BACKGROUND OF THE INVENTION

Data stored on magnetic media, such as a magnetic disks, are typically stored in encoded form, so that errors in the stored data can possibly be corrected. The errors may occur, for example, because of inter-symbol interference, a defect in the disk, or noise. As the density of the data stored on the disk increases, more errors are likely, and the system is required to correct greater numbers of errors, which include greater numbers of burst errors. A burst error is typically defined as a contiguous number of symbols in which the first symbol and the last symbol are erroneous. The speed with which the system corrects the errors, including the burst errors, is important to the overall speed with which the system processes the data.

Prior to recording, multiple-bit data symbols are encoded using an error correction code (ECC). When the data symbols are retrieved from the disk and demodulated, the ECC is employed to, as the name implies, correct the erroneous data.

Specifically, before a string of k data symbols is written to a disk, it is mathematically encoded using an (n, k) ECC to form n−k ECC symbols. The ECC symbols are then appended to the data string to form an n-symbol error correction code word, which is then written to, or stored, on the disk. When the data are read from the disk, the code words containing the data symbols and ECC symbols are retrieved and mathematically decoded. During decoding, errors in the data are detected and, if possible, corrected through manipulation of the ECC symbols [for a detailed description of decoding see, Peterson and Weldon, *Error Correction Codes*, 2nd Ed. MIT Press. 1972].

To correct multiple errors in strings of data symbols, the system typically uses an ECC that efficiently and effectively utilizes the various mathematical properties of sets of symbols known as Galois fields. Galois fields are represented "GF ($P^M$)", where "P" is a prime number and "M" can be thought of as the number of digits, base "P", in each element or symbol in the field. P usually has the value 2 in digital computer and disk drive applications and, therefore, M is the number of bits in each symbol. The ECC's commonly used with the Galois Fields are Reed Solomon codes or BCH codes.

Reed Solomon and BCH encoding and decoding operations involve a plurality of Galois field multiplication operations. The Galois field multiplication operations are modulo $g(x)$, which is the generator polynomial of the Galois field. The modulo $g(x)$ operation, also denoted mod $g(x)$, for $g(x)=g_n x^n + g_{n-1} x^{n-1} + \ldots + g_1 x + g_0$ is defined as $p(x)$ mod $g(x)=r(x)$, where $r(x)$ is the remainder of $p(x)$ divided by $g(x)$. Accordingly, $x^i$ mod $g(x)=x$, for $i<n$ $x^n$ mod $g(x)=g_{n-1}x^{n-1}+g_{n-2}x^{n-2}+ \ldots +g_1x+g_0$ $x^{n+1}$ mod $g(x)=g_{n-1}x^{n-1}+g_{n-2}x^{n-2}+ \ldots g_1x+g_0)+g_{n-2}x^{n-1}+g_{n-3}x^{n-2}+ \ldots +g_1x^2+g_0x$ $x^{n+j}$ mod $g(x)=d_{j,n-1}x^{n-1}+d_{j,n-2}x^{n-2}+ \ldots d_{j,1}x+d_{j,0}$ The conventional Galois field multiplication operation over GF($2^n$) involves three steps: multiplying two degree-(n−1) polynomials $a(x)$ and $b(x)$ together bit-by-bit to produce a degree-(2n−2) polynomial $c(x)$; mapping the $x^{2n-2}$, $x^{2n-3}$, ... $x^n$ terms of $c(x)$ to:

$$\sum_{i=0}^{n-1}\left[\sum_{j=0}^{n-2} c_{n+j} d_{j,i}\right] x^i$$

and exclusive-OR'ing the terms of the summation to the $x^{n-1}, x^{n-2}, \ldots x^0$ terms of $c(x)$. This conventional method involves, in the first step, 2n−1 bit computations to produce the degree-(2n−2) polynomial and, in the second step, a complicated mapping scheme. For example, Galois field multiplication over GF($2^8$), with $g(x)=x^8+x^4+x^3+x^2+1$ includes the relatively complicated mapping of the sequence $c_{14}, c_{13} \ldots c_8$ to the sequence $c_{11}+c_{12}+c_{13}$, $c_{10}+c_{11}+c_{12}$, $c_9+c_{10}+c_{11}$, $c_8+c_9+c_{10}+c_{14}$, $c_8+c_9+c_{11}+c_{12}$, $c_8+c_{10}+c_{12}+c_{13}$, $c_9+c_{13} c_{14}, c_8+c_{12}+c_{13}$. For larger Galois fields the mapping is even more complicated.

One known prior system avoids the complicated mapping by performing sequential modulo $g(x)$ operations. Such a system uses the results of a previous $x^i b(x)$ mod $g(x)$ computation to determine $x^{i+1}b(x)$ mod $g(x)=x[x^i b(x)$ mod $g(x)]$ mod $g(x)$. The iteration involves one shift and one exclusive-OR operation of two n-bit symbols. While each iteration is straight forward, the entire operation is slow, particularly for larger Galois fields, because of the number of iterations that must be performed.

Larger Galois fields, that is, fields larger than GF($2^8$) are being used more and more as the density of the data increases. The larger fields are necessary to produce the longer data codewords that are required to protect the data. Consequently, Galois field multiplication operations over the larger fields must be performed to both encode and decode the data codewords. What is needed is a Galois field multiplier that is less complex than the conventional Galois field multipliers, and produces the product relatively quickly.

SUMMARY OF THE INVENTION

A Galois field multiplier for Galois fields GF($2^n$), with n=2m, multiplies two n-bit polynomials to produce $a(x)*b(x)=a(x)b(x)$ mod $g(x)$ where:

$a(x)=a_{n-1}x^{n-1}+a_{n-2}x^{n-2}+ \ldots +a_2x^2+a_1x^1+a_0$ $b(x)=b_{n-1}x^{n-1}+b_{n-2}x^{n-2}+ \ldots +b_2x^2+b_1x+b_0$ $g(x)$ is a generator polynomial for the Galois field and "*" represents multiplication over the Galois field. The Galois Field multiplier treats each polynomial as the sum of two m-bit polynomials:

$a(x)=a_H(x)x^m+a_L(x)$ and $b(x)=b_H(x)x^m+b_L(x)$, with $a_H(x)x^m=[a_{n-1}x^{(n-1)-m}+a_{n-2}x^{(n-2)-m}+ \ldots +a_{m+1}x^{(m+1)-m}+a_m]x^m$ $a_L(x)=a_{m-1}x^{m-1}+a_{m-2}x^{m-2}+ \ldots +a_2x^2+a_1x+a_0$ $b_H(x)x^m=[b_{n-1}x^{(n-1)-m}+b_{n-2}x^{(n-2)-m} \ldots +b_{m+1}x^{(m+1)-m}+b_m]x^m$ and $$b_L(x)=b_{m-1}x^{m-1}+b_{m-2}x^{m-2}+\ldots+b_2x^2+b_1x+b_0.$$

Multiplying the two polynomials then becomes:

$$a(x)*b(x)=(a_H(x)x^m+a_L(x))*(b_H(x)x^m+b_L(x))= \qquad \text{eqn. 1}$$

$$[(a_H(x)b(x)_H)x^m \bmod g(x)+(b_H(x)a_L(x)+a_H(x)b_L(x))]x^m \bmod g(x)+ a_L(x)b_L(x). \qquad \text{eqn. 2}$$

The Galois field multiplier produces four polynomial products, namely, $a_H(x)b_H(x)=V_3$; $b_H(x)a_L(x)=V_2$; $a_H(x)b_L(x)=V_1$; and $a_L(x)b_L(x)=V_0$, in parallel four m-bit polynomial multipliers. Next, a modulo subsystem multiplies $V_3$ by $x^m$ and performs a modulo $g(x)$ operation on the product $V_3x^m$, as described below. The result is added to the sum $V_2+V_1$, and this sum is supplied to the modulo subsystem which multiplies the sum by $x^m$ and performs a second modulo $g(x)$ operation. The result of the second modulo $g(x)$ operation is then added to the remaining term of the equation, namely, $V_0$, to produce $a(x)*b(x)$.

Each modulo $g(x)$ operation involves a polynomial of degree $[(n-2)+m]$ or less. A degree $(n-2)$ polynomial, for example, $V_3$, is supplied to the modulo subsystem, which treats the polynomial as the sum of two m-bit polynomials $V_{3H}x^m$ and $V_{3L}$, where $V_{3H}=0x^{(n-1)-m}+v_{n-2}x^{(n-2)-m}+\ldots+v_{m+1}x+v_m$ and $V_{3L}=v_{m-1}x^{m-1}+v_{m-2}x^{m-2}+\ldots+v_1x+v_0$. For $g(x)=x^n+g_{n-1}x^{n-1}+\ldots+g_1x^1+g_0$, which has "k" non-zero coefficients, the modulo circuit produces $m-(k-2)$ cyclically shifted versions of an n-bit symbol that consists of the coefficients of $V_{3H}$ followed by m zeros. The versions are cyclically shifted to the right by, respectively, $m-j_{k-2}$ bit positions, $m-j_{k-3}$ bit positions ... and $m-j_1$ bit positions, where $j_i$ is the power of the $i^{th}$ non-zero term of the generator polynomial. The results of the shifting operations are summed and then added to an n-bit symbol that consists of the coefficients $V_{3L}V_{3H}$, i.e., $V_{3L}x^m+V_{3H}$. The result is $V_3*x^m$.

As discussed in more detail below, a Galois field multiplier for $GF(2^n)$ with $n=2m+1$ operates in essentially the same manner.

The Galois field multiplier described above performs a Galois field multiplication of two n-bit polynomials by performing in parallel a plurality of m-bit polynomial multiplications, and two modulo $g(x)$ operations on polynomials of degree $(n-2)+m$ or less. These operations are performed in less time and using less complex circuitry than the n-bit multiplication operation and the single modulo $g(x)$ operation on a polynomial of degree-$(2n-2)$ required with conventional Galois field multipliers. Specifically, the Galois field multiplier described above does not perform either the multiplication of two n-bit symbols that represent the coefficients of the two n-bit polynomials, which requires $(2n-1)$ computations, or the complex mapping for the modulo $g(x)$ operation that are required by the prior Galois field multipliers. Further, the Galois field multiplier described above does not require the storage space for a $(2n-1)$-bit polynomial, which is the result of multiplying two n-bit polynomials, and/or storage space for the look-up tables that are typically used to speed up the operations of the conventional Galois field multiplier.

BRIEF DESCRIPTION OF THE DRAWINGS

The invention description below refers to the accompanying drawings, of which.

DETAILED DESCRIPTION OF AN ILLUSTRATIVE EMBODIMENT

Galois field multiplication is modulo the generator polynomial $g(x)$. We use the symbol "*" herein to represent Galois field multiplication, and omit the * symbol when the multiplication is polynomial multiplication. Thus, $a(x)*b(x)=a(x)b(x) \bmod g(x)$.

Figure 1:
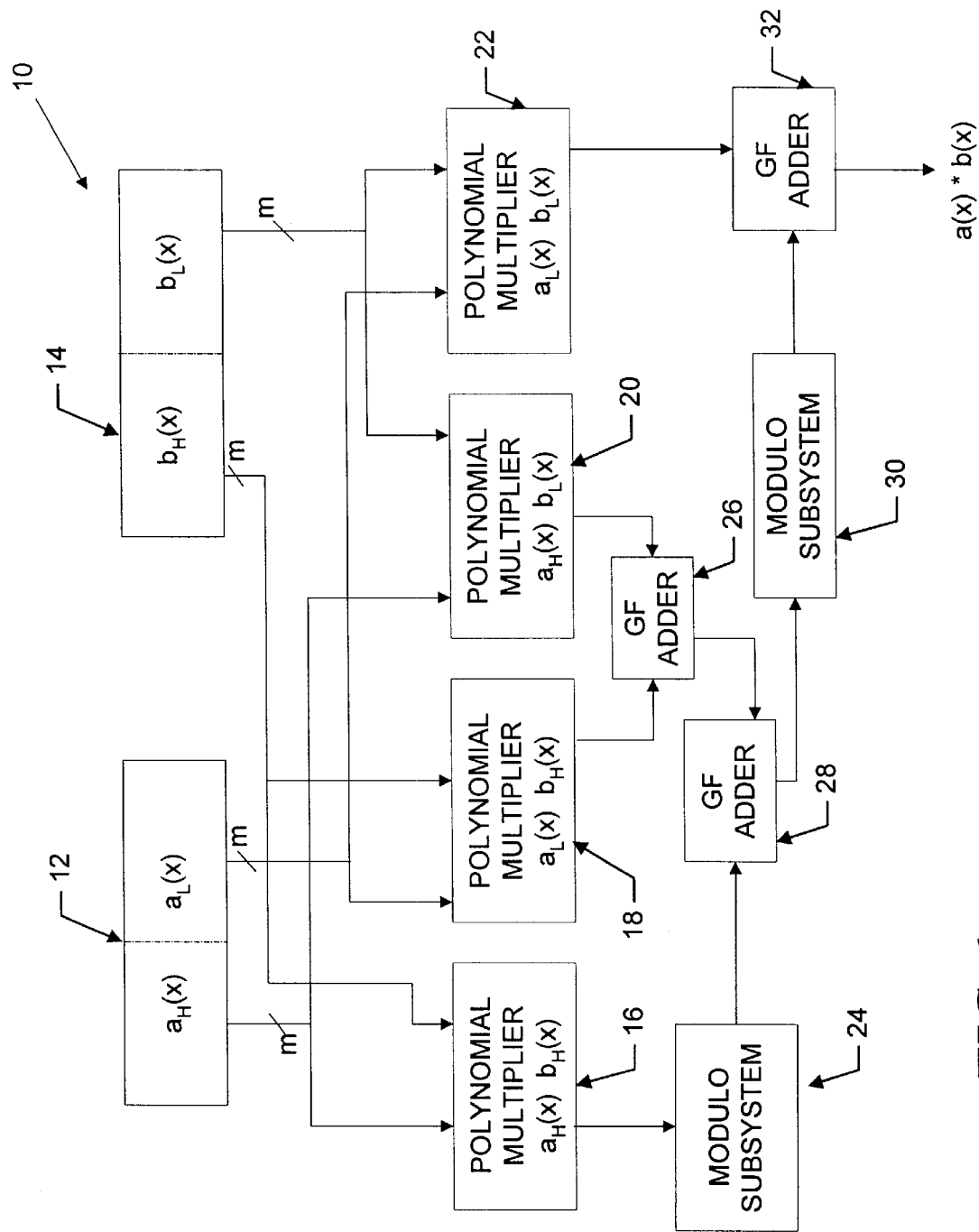
FIG. 1 is a functional block diagram of a Galois Field multiplier constructed in accordance with the invention.

Referring now to FIG. 1, a Galois field multiplier 10 for multiplying two polynomials $a(x)$ and $b(x)$ over $GF(2^n)$, where $n=2m$, includes two n-bit registers 12 and 14 that hold, respectively, the coefficients of the polynomials $a(x)$ and $b(x)$. The Galois field multiplier treats the polynomials:

$$a(x)=a_{n-1}x^{n-1}+a_{n-2}x^{n-2}+\ldots+a_2x^2+a_1x^1+a_0$$

and $$b(x)=b_{n-1}x^{n-1}+b_{n-2}x^{2-2}+\ldots+b_2x^2+b_1x^1+b_0$$

as $a(x)=a_H(x)x^m+a_L(x)$ and $b(x)=b_H(x)x^m+b_L(x)$, where $$a_H(x)x^m=[a_{n-1}x^{(n-1)-m}+a_{n-2}x^{(n-2)-m}+\ldots+a_{m+1}x+a_m]x^m$$

$$a_L(x)=a_{m-1}x^{m-1}+a_{m-2}x^{m-2}+\ldots+a_1x+a_0$$

$$b_H(x)x^m=[b_{n-1}x^{(n-1)-m}+b_{n-2}x^{(n-2)-m}+\ldots+b_{m+1}x+b_m]x^m$$

and $$b_L(x)=b_{m-1}x^{m-1}+b_{m-2}x^{m-2}+\ldots+b_1x+b_0.$$

Multiplication is then:

$$a(x)*b(x)=(a_H(x)x^m+a_L(x))*(b_H(x)x^m+b_L(x)) \qquad \text{eqn. 1}$$

$$=[a_H(x)b_H(x)x^m \bmod g(x)+b_H(x)a_L(x)+a_H(x)b_L(x)]x^m \bmod g(x)+ a_L(x)b_L(x) \qquad \text{eqn. 2}$$

The four products of eqn. 2, namely, $V_3=a_H(x)b_H(x)$, $V_2=b_H(x)a_L(x)$, $V_1=a_H(x)b_L(x)$, and $V_0=a_L(x)b_L(x)$ are produced in parallel in m-bit polynomial multipliers 16, 18, 20 and 22, which each receive from the registers 12 and 14, respectively, the m-bits that represent the appropriate m coefficients of the polynomials $a(x)$ and $b(x)$.

Specifically, the m-bit polynomial multiplier 16 receives the coefficients of $a_H(x)$ and $b_H(x)$ and operates in a conventional manner to produce the polynomial $V_3$. The multiplier 18 receives the coefficients of $b_H(x)$ and $a_L(x)$ and produces the polynomial $V_2$, also in a conventional manner. Similarly, the m-bit multipliers 20 and 22 receive the appropriate coefficients to produce in a conventional manner, the polynomials $V_1$ and $V_0$, respectively.

A Galois field adder 26, which also operates in a conventional manner, adds the polynomials produced by the multipliers 18 and 20 by exclusive-Or'ing the coefficients of like terms, to produce the sum $V_2+V_1$. The sum is then supplied to a Galois field adder 28. At the same time, a modulo subsystem 24 determines $V_3x^m \bmod g(x)$. The operations of the modulo subsystem 24 are discussed below with reference to FIG. 2.

The degree-$(n-2)$ polynomial produced by the modulo subsystem 24 is added in the adder 28 to the sum produced by the adder 26. The adder 28 produces a degree-$(n-2)$ polynomial $C(x)$, which is the bracketed expression of eqn. 2. The polynomial $C(x)$ is then supplied to a modulo subsystem 30, which operates in the same manner as modulo subsystem 24. The degree-(n–2) polynomial, $C(x)x^n$ mod $g(x)$, produced by the modulo subsystem 30 is then added in Galois field adder 32 to the polynomial $V_0$ produced by the polynomial multiplier 22. The result is $a(x)*b(x)$. As is understood by those skilled in the art, the product $a_L(x)b_L(x)$ need not be supplied to a modulo subsystem since the degree of the product is less than n.

The Galois field multiplier of FIG. 1 may instead be constructed using a single modulo subsystem that is used twice to produce, at the appropriate times, $V_3x^m$ mod $g(x)$ and $C(x)x^m$ mod $g(x)$. Further, the operations of some or all of the various polynomial multipliers, adders and modulo subsystems that are depicted in block diagram form in FIG. 1 may be performed in software or firmware.

Figure 2:
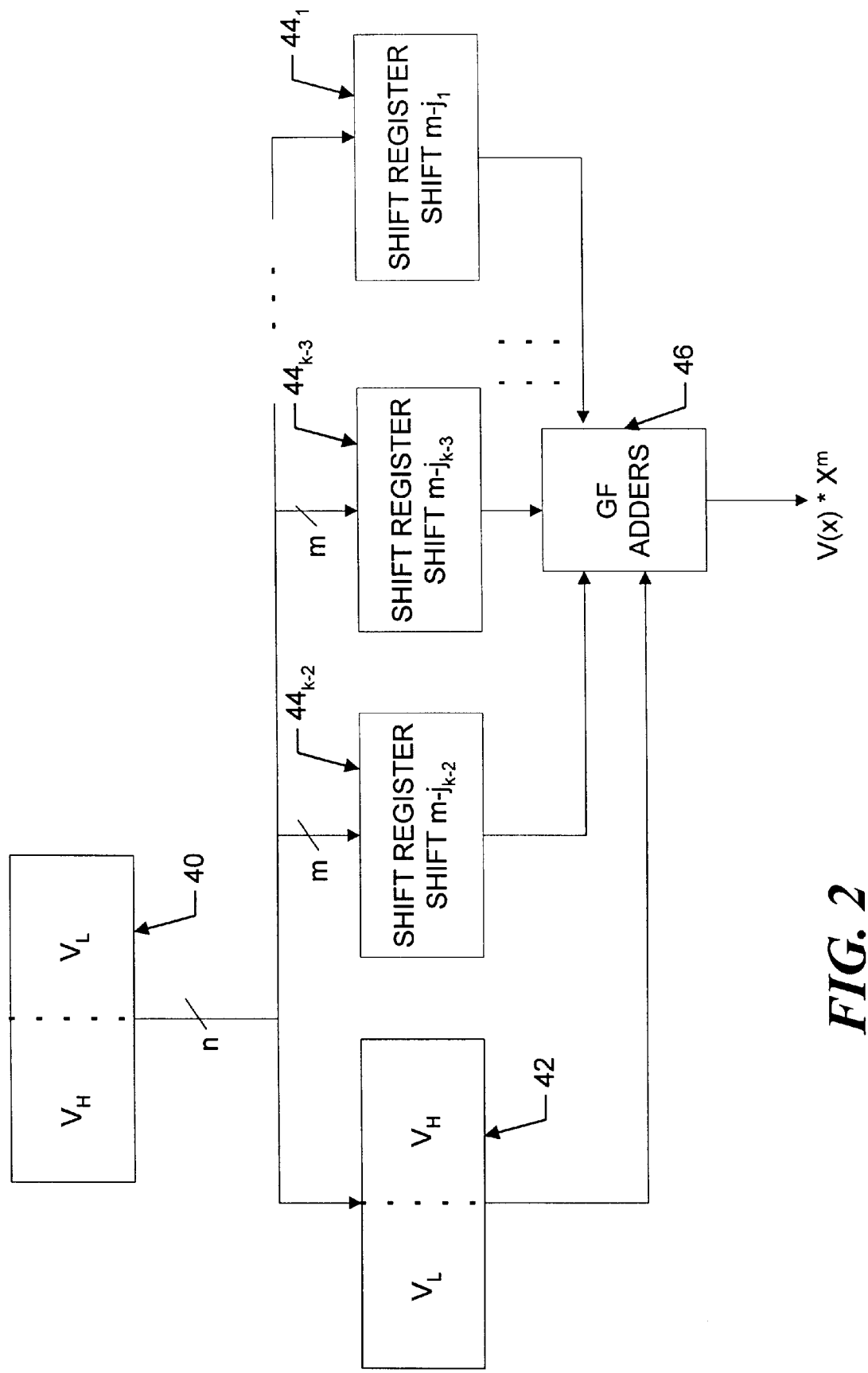
FIG. 2 is a functional block diagram of a modulo subsystem included in the multiplier of FIG. 1.

Referring now to FIG. 2, the modulo subsystem 24 is depicted in block diagram form. The operations performed by the modulo subsystem involve a polynomial of degree less than $(n-1)+n\frac{1}{2}$, that is, less than $(n-1)+m$, and are performed essentially by strategically cyclically shifting various coefficients of the polynomial and then combining or adding the shifted coefficients.

The operations of modulo subsystem 24 are discussed below in conjunction with determining $V_3*x^m = V_3x^m$ mod $g(x)$, where the generator polynomial $g(x) = x^n + g_{n-1}x^{n-1} + \ldots + g_1x^1 + g_0$ has "k" non-zero coefficients.

The modulo subsystem 24 treats the polynomial $V_3$ as the sum of two m-bit polynomials, namely, $V_{3H}x^m + V_{3L}$. The polynomial $V_3$ has degree-(n–2) and thus the coefficient of the $x^{n-1}$ term is zero. Accordingly, $$V_{3H}x^m = (0x^{(n-1)-m} + v_{n-2}x^{(n-2)-m} + \ldots + v_{m+1}x + v_m)x^m \text{ and } V_{3L} = v_{m-1}x^{m-1} + \ldots + v_1x^1 + v_0.$$

Then bits in register 40 are supplied to register 42, which holds them in the order $V_{3L}$, $V_{3H}$ or $v_{m-1}, v_{m-2}, \ldots, v_0, 0, v_{n-1} \ldots v_m$. The register 42 thus holds the coefficients of $V_{3L}x^m + V_{3H}$. The m bits corresponding to the coefficients of $V_{3H}$, are also supplied to n-bit registers $44_{k-2}, 44_{k-3}, \ldots 44_1$, which each hold the m bits in the highest-order m shift register locations, and hold m all-zero bits in the m lowest-order shift register locations. The shift registers thus each contain the n-bit symbol 0, $v_{n-2}, v_{n-1} \ldots v_m, 0, 0, \ldots 0$. The registers $44_{k-2}, 44_{k-3} \ldots 44_1$ next cyclically shift their contents to the right based on the powers of the non-zero terms in the generator polynomial. The register $44_{k-2}$ cyclically shifts the n bits m–$j_{k-2}$ bit positions to the right, where k is the number of non-zero coefficients in $g(x)$ and $j_i$ is the power of the $i^{th}$ non-zero term in the generator polynomial. If, for example, the generator polynomial $g(x)$ has 5 non-zero coefficients $g_n, g_{-5}, g_{n-9}, g_{n-10}, g_0$, the $x^n$ term is the $(k-1)^{st}$ term, the $x^{n-5}$ term is the $(k-2)^{nd}$ term, and so forth. The shift register $44_{k-2}$ shifts the n-bit symbol to the right m–(n–5) bit positions, and then contains the symbol $$\underbrace{0\ldots00}_{m-(n-5)}\ \underbrace{0,\ V_{n-2}\ldots V_m}_{V_{3H}}.$$

The registers $44_{k-3} \ldots 44^1$ similarly shift their n-bit symbols to the right by m–$j_{k-3}, \ldots$ m–$j_1$ bit positions, respectively. The shifted symbols, that is, the contents of registers $44_{k-2}$, $44_{k-3} \ldots 44_1$, are then added and the sum is, in turn, added to the contents of register 42, to produce the coefficients of the polynomial $$V_3(x)*x^m = a_H(x)b_H(x)x^m \text{ mod } g(x).$$

As an example of the operations of the modulo $g(x)$ circuit 24 consider $T(x)*x^m$ over $GF(2^8)$ with $g(x) = x^8+x^4+x^3+x^2+1$ and $$T(x) = t_6x^6 + t_5x^5 + t_4x^4 + t_3x^3 + t_2x^2 + t_1x + t_0.$$

The modulo $g(x)$ circuit produces $T(x)x^4$ mod $g(x)$:

$$[(t_6x^6+t_5x^5+t_4x^4+t_3x^3+t_2x^2+t_1x+t_0)x^4] \text{ mod } g(x)= \quad \text{eqn. 3}$$

$$[t_6x^{10}+t_5x^9+t_4x^8+t_3x^7+t_2x^6+t_1x^5+t_0x^4] \text{ mod } g(x) \quad \text{eqn. 4}$$

The terms of eqn. 4 that have powers that are less than 8, namely $t_3x^7 \ldots t_0x^4$, are not altered by the modulo $g(x)$ operation, since $x^i$ mod $g(x) = x^i$ for all i<n. The remaining terms of eqn. 4 are altered by the modulo $g(x)$ operation and become:

$$t_6[x^2(x^4+x^3+x^2+1)]+t_5[x(x^4+x^3+x^2+1]+t_4(x^4+x^3+x^2+1) \text{ or}$$

$$t_6(x^6+x^5+x^4+x^2)+t_5(x^5+x^4+x^3+x)+t_4(x^4+x^3+x^2+1)$$

Accordingly, $C(x)x^m$ mod $g(x)$ equals $$t_6(x^6+x^5+x^4+x^2)+t_5(x^5+x^4+x^3+x)+t_4(x^4+x^3+x^2+1)+t_3x^7+t_2x^6+t_1x^5+t_0x^4.$$

The modulo subsystem 24 holds the eight bits that correspond to the coefficients of $T(x)$ and a leading zero that corresponds to the coefficient of $x^7$ in the register 40. The circuit treats $T(x)$ as $T_H(x)x^4 + T_L(x)$, with $$T_L = t_3x^3 + t_2x^2 + t_1x + t_0 \text{ and } T_Hx^4 = (0x^3+t_6x^2+t_5x^1+t_4)x^4.$$

The n-bits that represent the coefficients of $T_H$ and $T_L$ are supplied to register 42. The register 42 holds the bits in the order $T_LT_H$. The register 42 thus holds the coefficients of $T_Lx^4+T_H$. The n-bit shift registers $44_3$, $44_2$ and $44_1$ hold the m coefficients of $T_H$ in their m highest-order locations and m all-zero bits in the lowest-order locations. The contents of the registers $44_3$, $44_2$, and $44_1$ are then shifted to the right by 0, 1 and 2 bit positions, respectively, to produce $T_Hx^4$, $T_Hx^3$ and $T_Hx^2$. The registers thus contain:

$$\underbrace{0t_6t_5t_40000}_{Register\ 44_3}\quad \underbrace{00t_6t_5t_4000}_{Register\ 44_2}\quad \underbrace{000t_6t_5t_400}_{Register\ 44_1}$$

The contents of the shift registers $44_3$, $44_2$ and $44_1$ and the contents of the register 42 are then added together to produce:

$$x^4T_L + T_H + x^4T_H + x^3T_H + x^2T_H =$$

$$(t_3x^7 + t_2x^6 + t_1x^5 + t_0x^4) + (0x^3 + t_6x^2 + t_5x^1 + t_4) +$$

$$(0x^7 + t_6x^6 + t_5x^4 + t_4x^4) + (0x^6 + t_6x^5 + t_5x^4 + t_4x^3) +$$

$$(0x^5 + t_6x^4 + t_5x^3 + t_4x^2) =$$

$$t_6(x^6 + x^5 + x^4 + x^2) + t_5(x^5 + x^4 + x^3 + x) +$$

$$t_4(x^4 + x^3 + x^2 + 1) + t_3x^7 + t_2x^6 + t_1x^5 + t_0x^4,$$

or $T(x)x^4$ mod $g(x)$.

Referring again to FIGS. 1 and 2, the operations of the Galois field multiplier 10 are discussed for the multiplication of two 16-bit polynomials over $GF(2^{16})$. We have selected as the generator polynomial $g(x) = x^{16}+x^8+x^5+x^3+1$. This generator polynomial has a minimum number of non-zero coefficients, and thus, minimizes the number of shift registers used in the modulo systems. In this example, m=8 and k=5.

The Galois field multiplier 10 multiplies two polynomials in $GF(2^{16})$, namely, $$a(x) = a_{15}x^{15}x + a_{14}x^{14} + \ldots + a_2x^2 + a_1x + a_0$$

and $$b(x)=b_{15}+x^{15}+b_{14}x^{14}+\ldots+b_2x^2+b_1x+b_0$$

to produce $a(x)*b(x)=a(x)b(x) \bmod g(x)$.

The Galois field multiplier treats each polynomial as the sum of two polynomials $a(x)=a_{H(x)}x^8+a_L(x)$ and $b(x)=b_H(x)x^8+b_L(x)$, with $$a_H(x)=a_{15}x^7+a_{14}x^6+a_{13}x^5+a_{12}x^4+a_{11}x^3+a_{10}x^2+a_9x+a_8$$

$$a_L(x)=a_7x^7+a_6x^6+a_5x^5+a_4x^4+a_3x^3+a_2x^2+a_1x+a_0$$

$$b_H(x)=b_{15}x^7+b_{14}x^6+b_{13}x^5+b_{12}x^4+b_{11}x^3+b_{10}x^2+b_9x+b_8$$

and $$b_L(x)=b_7x^7+b_6x^6+b_5x^5+b_4x^4+b_3x^3+b_2x^2+b_1x+b_0.$$

The 16 bits representing the coefficients of $a_H(x)$ and $a_L(x)$ are held in register 12, and the 16 bits representing the coefficients of $b_H(x)$ and $b_L(x)$ are held in register 14.

The eight bits representing the coefficients of $a_H(x)$ are supplied to two 8-bit polynomial multipliers 16 and 20, and the eight bits representing the coefficients of $a_L(x)$ are supplied to two eight-bit polynomial multipliers 18 and 22. At the same time, the eight bits representing the coefficients of $b_H(x)$ are supplied to the two 8-bit polynomial multipliers 16 and 18 and the eight bits representing the coefficients of $b_L(x)$ are supplied to the 8-bit polynomial multipliers 20 and 22. The multipliers produce, in parallel, the products:

$$a_H(x)b_H(x)=V_3,\ b_H(x)a_L(x)=V_2,\ a_H(x)b_L(x)=V_1 \text{ and } a_L(x)b_L(x)=V_0.$$

Specifically, the 8-bit polynomial multiplier 16 operates in a conventional manner to multiply together $$a_{15}x^7+a_{14}x^6+a_{13}x^5+a_{12}x^4+a_{11}x^3+a_{10}x^2+a_9x+a_8$$

and $$b_{15}x^7+b_{14}x^6+b_{13}x^5+b_{12}x^4+b_{11}x^3+b_{10}x^2+b_9x+b_8$$

to produce a polynomial of degree $2[(n-1)-m]=14$; the 8-bit polynomial multiplier 18 produces a degree-14 polynomial by multiplying together $$b_{15}x^7+b_{14}x^6+b_{13}x^5+b_{12}x^4+b_{11}x^3+b_{10}x^2+b_9x+b_8$$

and $$a_7x^7+a_6x^6+a_5x^5+a_4x^4+a_3x^3+a_2x^2+a_1x+a_0;$$

the multiplier 20 produces a degree-14 polynomial by multiplying together $$a_{15}x^7+a_{14}x^6+a_{13}x^5+a_{12}x^4+a_{11}x^3+a_{10}x^2+a_9x+a_8$$

and $$b_7x^7+b_6x^6+b_5x^5+b_4x^4+b_3x^3+b_2x^2+b_1x+b_0;$$

and, the multiplier 22 produces a degree-14 polynomial by multiplying together $$a_7x^7+a_6x^6+a_5x^5+a_4x^4+a_3x^3+a_2x^2+a_1x+a_0$$

and $$b_7x^7+b_6x^6+b_5x^5+b_4x^4+b_3x^3+b_2x^2+b_1x+b_0.$$

The degree-14 polynomial $V_3$ is then supplied to the modulo subsystem 24, the operations of which are described below with reference to FIG. 2. At the same time, the polynomials $V_2$ and $V_1$ are added together in the Galois field adder 26. The adder 26, which operates in a conventional manner, exclusive-Or's the coefficients of like terms of the polynomials to produce the sum $V_1+V_2$. The sum is added in the Galois field adder 28 to the degree-14 polynomial produced by the modulo subsystem 24. This sum, which is a degree-14 polynomial, is then supplied to the modulo subsystem 30. The modulo subsystem 30, which operates in the same manner as the modulo subsystem 24, produces a degree-14 polynomial that is then added to $V_0$ in Galois field adder 32. The result is $a(x)*b(x)=a(x)b(x) \bmod g(x)$.

Referring again to FIG. 2, the modulo subsystem 24, which produces $V_3*x^8=V_3\ x^8 \bmod g(x)$, includes a 16-bit register 40 that holds the coefficients of the degree-14 polynomial $V_3$ and a leading zero bit that corresponds to the coefficient of an term. The modulo subsystem treats $V_3$ as the sum of two polynomials, namely, $V_{3H}x^m+V_{3L}$, with $V_{3L}$ consisting of the coefficients of the m lowest-order terms of $V_3$ and $V_{3H}$ consisting of a leading zero bit and the coefficients of the m−1 highest order terms of $V_3$. The register 40 thus holds $$\underbrace{v_0, v_{14}, v_{13}, v_{12}, v_{11}, v_{10}, v_9, v_8}_{V_{3H}}\ \underbrace{v_7, v_6, v_5, v_4, v_3, v_2, v_1, v_0}_{V_{3L}}$$

The 16 bits held in register 40 are supplied to register 42, which holds them as $V_{3L}V_{3H}$. Also, the highest-order eight bits from register 40 are supplied to shift registers 44₃, 44₂ and 44₁, each of which contains eight all-zero bits in the eight lowest-order bit positions. The registers 44₃, 44₂ and 44₁ each hold $$\underbrace{0, v_{14}, v_{13}, v_{12}, v_{11}, v_{10}, v_9, v_8}_{V_{3H}}\ \underbrace{0, 0, 0, 0, 0, 0, 0, 0}_{0'_s}$$

The shift register 44₃ cyclically shifts the 16-bit symbol $V_{3H}$ 00000000 to the right $m-j_{k-2}$ or $8-j_3$ times. Based on the generator polynomial $g(x)=x^{16}+x^8+x^5+x^3+1$, $j_3=8$, and the shift register 44₃ thus does not shift the 16-bit symbol. The shift registers 44₂ and 44₁ cyclically shift the symbol $V_{3H}$ 00000000 to the right by 8−5=3 bit positions and 8−3=5 bit positions, respectively, to produce in the registers the symbols:

000$V_{3H}$00000 and 00000$V_{3H}$000.

The contents of the registers 44₃, 44₂ and 44₁, which are the polynomials $V_{3H}x^4$, $V_{3H}x^3$ and $V_{3H}x^2$, and the contents of register 42, which is $V_{3L}x^4+V_{3H}$ are then summed in adders 46. The result is a 16-bit symbol that represents the coefficients of $V_3*x^8=V_3x^8 \bmod g(x)$.

The modulo subsystem 30 operates in the same manner as the modulo subsystem 24, to produce the quantity $C(x)x^m \bmod g(x)$ where $C(x)=[V_3x^m \bmod g(x)+(V_1+V_2)]$.

Figure 3:
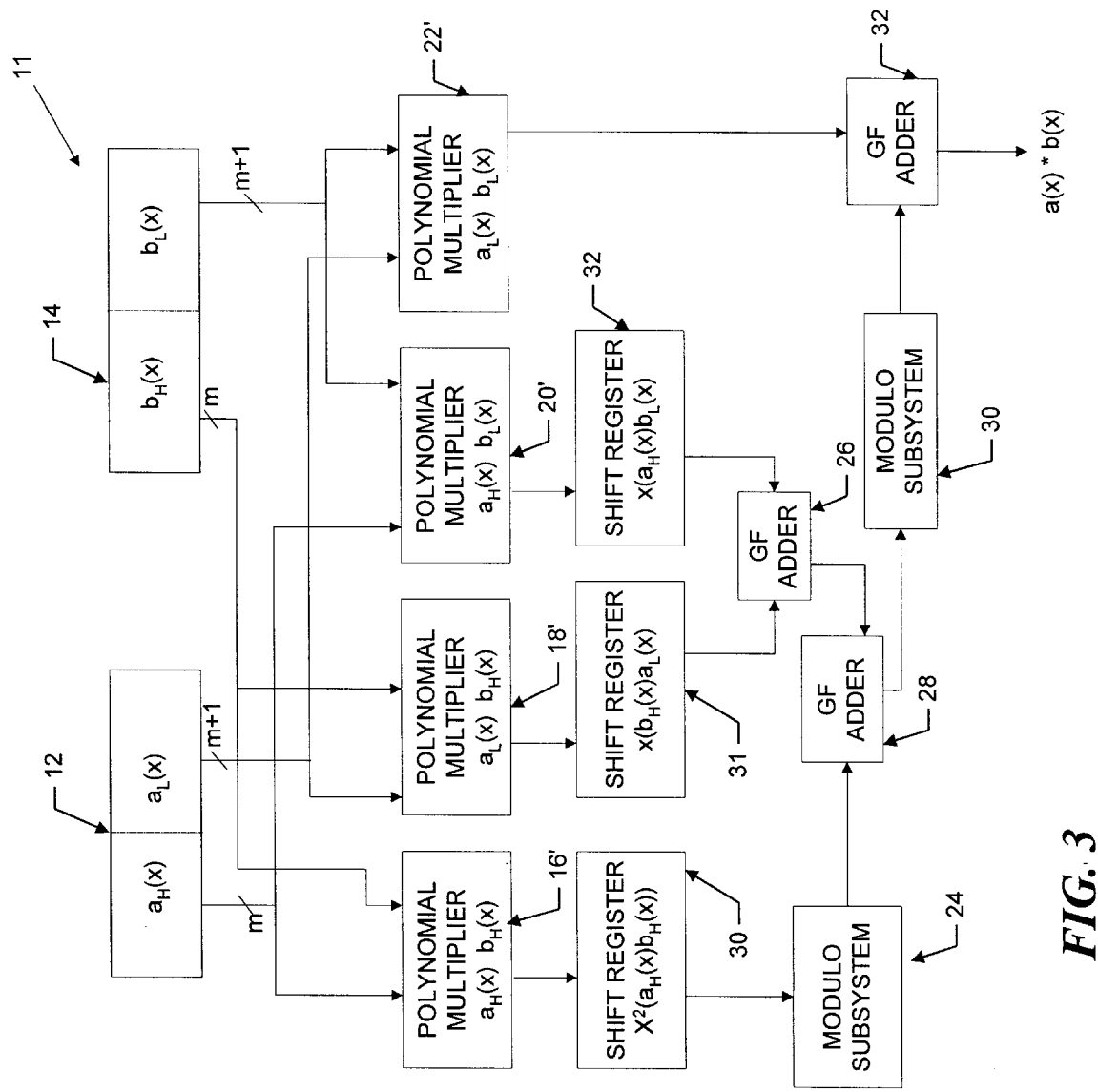
FIG. 3 is a functional block diagram of an alternative Galois field multiplier.

Referring now to FIG. 3, a Galois field multiplier 11 for multiplying two polynomials $a(x)$ and $b(x)$ over $GF(2^n)$, where $n=2m+1$, includes two n-bit registers 12 and 14 that hold, respectively, the coefficients of the polynomials $a(x)$ and $b(x)$. The Galois field multiplier treats the polynomials:

$$a(x)=a_{n-1}x^{n-1}+a_{n-2}x^{n-2}+\ldots+a_2x^2+a_1x^1+a_0$$

and $$b(x)=b_{n-1}x^{n-1}+b_{n-2}x^{n-2}+\ldots+a_2x^2+a_1x^1+a_0$$

as $a(x)=a_H(x)x^{m+1}+a_L(x)$ and $b(x)=b_H(x)x^{m+1}+b_L(x)$, where $$a_H(x)x^{m+1} = [a_{n-1}x^{(n-1)-(m+1)} + a_{n-2}x^{(n-2)-(m+1)} + \ldots + a_{m+1}]x^{m+1}$$

$$a_L(x) = a_m x^m + a_{m-1}x^{m-1} + \ldots + a_1 x + a_0$$

$$b_H(x)x^{m+1} = [b_{n-1}x^{(n-1)-(m+1)} + b_{n-2}x^{(n-2)-(m+1)} + \ldots + b_{m+1}]x^{m+1}$$

and $$b_L(x) = b_m x^m + b_{m-1}x^{m-1} + \ldots + b_1 x + b_0.$$

For example, in $GF(2^{13})$ with $m=6$, $a_H(x)$ includes the terms $a_{12}x^5$, $a_{11}x^4 \ldots a_7$ and $a_L(x)$ includes the terms $a_6 x^6$, $\ldots a_1 x^1$, $a_0$. Thus, $a_H(x)$ and $b_H(x)$ are polynomials of degree less than m, and $a_L(x)$ and $b_L(x)$ are polynomials of degree less than m+1. Multiplication is then:

$$a(x)*b(x) = (a_H(x)x^{m+1}) + a_L(x))*(b_H(x)x^{m+1} + b_L(x)) = \quad \text{eqn. 1'}$$
$$(x(a_H(x)x^m) + a_L(x)) + (x(b_H(x)x^m + b_L(x)) =$$

$$[x^2(a_H(x)b_H(x))x^m \bmod g(x) + x(b_H(x)a_L(x)) + \quad \text{eqn. 2'}$$
$$x(a_H(x)b_L(x))]x^m \bmod g(x) + a_L(x)b_L(x)$$

The four products of eqn. 2', namely, $V_3' = a_H(x)b_H(x)$, $V_2' = b_H(x)a_L(x)$, $V_1' = a_H(x)b_L(x)$, and $V_0' = a_L(x)b_L(x)$ are produced in parallel in m+1-bit polynomial multipliers 16', 18', 20' and 22', which receive from the registers 12 and 14, respectively, the m-bits that represent the appropriate m coefficients of $a_H(x)$ and/or $b_H(x)$ and the (m+1)-bits that represent the appropriate m+1 coefficients of $a_L(x)$ and/or $b_L(x)$.

Specifically, the polynomial multiplier 16' receives the coefficients of $a_H(x)$ and $b_H(x)$ and operates in a conventional manner to produce the polynomial $V_3'$. The multiplier 18' receives the coefficients of $b_H(x)$ and $a_L(x)$ and produces the polynomial $V_2'$, also in a conventional manner. Similarly, the m-bit multipliers 20' and 22' receive the appropriate coefficients to produce in a conventional manner, the polynomials $V_1'$ and $V_0'$, respectively.

The products produced by polynomial multipliers 16', 18', 20' are supplied to shift registers 30, 31 and 32, respectively. The shift register 30 shifts $V_3'$ two bit positions to the left to produce $x^2 V_3' = x^2(a_H(x)b_H(x))$; the shift register 31 shifts $V_2'$ one bit position to the left to produce $xV_2' = x(b_H(x)a_L(x))$; and the shift register 32 shifts $V_1'$ one bit position to the left to produce $xV_1' = x(a_H(x)b_L(x))$. The contents of the shift to register 30 are then supplied to the modulo subsystem 24, which determines $(x^2 V_3')x^m \bmod g(x)$. At the same time the contents of shift registers 31 and 32 are added together in the Galois field adder 26, to produce the sum $V_2' + V_1'$. The sum is then supplied to the Galois field adder 28, which adds the sum to the polynomial produced by the modulo subsystem 24.

The sum produced by adder 28, which is the bracketed expression of eqn. 2', is then supplied to the modulo subsystem 30, which operates in the same manner as modulo subsystem 24. The result produced by the modulo subsystem 30 is then added in Galois field adder 32 to the product $V_0'$ produced by the polynomial multiplier 22', and the result is the product $a(x)*b(x)$. As is understood by those skilled in the art, the product $a_L(x)b_L(x)$ need not be supplied to a modulo subsystem since the degree of the product is less than n.

The Galois field multiplier of FIG. 3 may instead be constructed using a single modulo subsystem, which is used twice during the Galois field multiplication operation. Alternatively, the operations of some or all of the various circuits that are depicted in block diagram form in FIG. 3 may be performed in software or firmware. Further, the polynomials $a_H(x)$ and $b_H(x)$ may each be shifted one bit position to the left before they are supplied to the multipliers 16', 18' and 20', instead of shifting the products produced by the multipliers one or two positions to the left as discussed above.

We claim:

1. A Galois field multiplier for multiplying two polynomials a(x) and b(x) over $GF(2^n)$, with n=2m the Galois field multiplier including:

A. four m-bit polynomial multipliers to produce products $a_H(x)b_H(x)$, $b_L(x)a_L(x)$, $a_H(x)b_L(x)$, and $b_H(x)a_L(x)$ where $$a_H(x)x^m = [a_{n-1}x^{(n-1)-m} + a_{n-2}x^{(n-2)-m} + \ldots + a_{m+1}x + a_m]x^m$$

$$a_L(x) = a_{m-1}x^{m-1} + a_{m-2}x^{m-2} + \ldots + a_1 x + a_0$$

$$b_H(x)x^m = [b_{n-1}x^{(n-1)-m} + b_{n-2}x^{(n-2)-m} + \ldots + b_{m+1}x + b_m]x^m$$

and $$b_L(x) = b_{m-1}x^{m-1} b_{m-2}x^{m-2} + \ldots + b_1 x + b_0;$$

B. means for determining $[a_H(x)b_H(x)]x^m \bmod g(x)$;

C. a plurality of Galois field adders for adding the products and $[a_H(x)b_H(x)]x^m \bmod g(x)$ to produce the sum $(a_H(x)b_H(x))x^m \bmod g(x) + (b_H(x)a_L(x) + a_H(x)b_L(x))$;

D. means for determining $[[a_H(x)b_H(x)]x^m \bmod g(x) + (b_H(x)a_L(x) + a_H(x)b_L(x))]x^m \bmod g(x)$; and E. an additional Galois field adder for producing the sum $[[(a_H(x)b_H(x))x^m \bmod g(x) + (b_H(x)a_L(x) + a_H(x)b_L(x))] x^m \bmod g(x)] + b_L(x)a_L(x)$.

2. The Galois field multiplier of claim 1 wherein the means for determining $[a_H(x)b_H(x)]x^m \bmod g(x)$ includes:

i. a register for holding coefficients of $a_H(x)b_H(x) = V(x)$ as $V_L V_H$, where $V_H x^m = (0 + v_{n-2}x^{(n-2)-m} + \ldots + v_{m+1}x + v_m)x^m$, and $V_L = v_{m-1}x^{m-1} + \ldots + v_1 x^1 + v_0$;

ii. a plurality of shift registers for cyclically shifting n-bit symbols that include the m coefficients of $V_H$ followed by m all-zero symbols by, respectively, $m-j_i$ where $j_i$ is the power of the $i^{th}$ non-zero term of generator polynomial g(x) for i=k-2, k-1, ..., 1 and k is the number of non-zero coefficients in the generator polynomial; and iii. a plurality of Galois field adders for adding together the contents of the register and the plurality of shift registers.

3. The Galois field multiplier of claim 1 wherein the means for determining $[a_H(x)b_H(x)]x^m \bmod g(x) + (b_H(x)a_L(x) + a_H(x)b_L(x))]x^m \bmod g(x)$ includes:

i. a register for holding coefficients of $[a_H(x)b_H(x)]x^m \bmod g(x) + (b_H(x)a_L(x) + a_H(x)b_L(x))] = C(x)$ as $C_{3L} C_{3H}$, where $C_{3H}x^m = (0 + c_{n-2}x^{(n-2)-m} + \ldots + c_{m+1}x + c_m)x^m$ and $C_{3L} = C_{m-1}x^{m-1} + \ldots + v_1 x^1 + v_0$;

ii. a plurality of shift registers for cyclically shifting n-bit symbols that include the m coefficients of $C_{3H}$ followed by m all-zero symbols by, respectively, $m-j_i$ where $j_i$ is the power of the $i^{th}$ non-zero term of generator polynomial g(x) for i=k-2, k-1 ... 1 and k is the number of non-zero coefficients in the generator polynomial; and iii. a plurality of Galois field adders for adding together the contents of the register and the plurality of shift registers.

4. A Galois field multiplier for multiplying two polynomials a(x) and b(x) over $GF(2^n)$, with n=2m+1, the Galois field multiplier including:

A. four (m+1)-bit polynomial multipliers to produce products $a_H(x)b_H(x)$, $b_L(x)a_L(x)$, $a_H(x)b_L(x)$, and $b_H(x)a_L(x)$ where $$a_H(x)x^{m+1}=[a_{n-1}x^{(n-1)-(m+1)}+a_{n-2}x^{(n-2)-(m+1)}+ \ldots +a_{m+1}]x^{m+1}$$

$$a_L(x)=a_m x^m+a_{m-1}x^{m-1}+ \ldots +a_1 x+a_0$$

$$b_H(x)x^{m+1}=[b_{n-1}x^{(n-1)-(m+1)}+ \ldots +b_{m+1}]x^{m+1};$$

B. a plurality of shift registers for
  i. cyclically shifting $a_H(x)b_H(x)$ by two bit positions to produce $[a_H(x)b_H(x)]x^2$,
  ii. cyclically shifting $a_H(x)b_L(x)$ one bit position to produce $[a_H(x)b_L(x)]x$, and
  iii. cyclically shifting $b_H(x)a_L(x)$ one bit position to produce $[b_H(x)a_L(x)]x$,
B. means for determining $[x^2(a_H(x)b_H(x))]x^m \mod g(x)$;
C. a plurality of Galois field adders for adding the products and $[x^2(a_H(x)b_H(x))]x^m \mod g(x)$ to produce the sum $[x^2(a_H(x)b_H(x))]x^m \mod g(x)+[x(b_H(x)a_L(x))+x(a_H(x)b_L(x))]$;
D. means for determining $[x^2(a_H(x)b_H(x))x^m \mod g(x)+[x(b_H(x)a_L(x))+x(a_H(x)b_L(x))]x^m \mod g(x)$; and
E. an additional Galois field adder for producing the sum $[[x^2(a_H(x)b_H(x))x^m \mod g(x)+[x(b_H(x)a_L(x))+x(a_H(x)b_L(x))]x^m \mod g(x)]+b_L(x)a_L(x)$.

5. The Galois field multiplier of claim 4 wherein the means for determining $[x^2(a_H(x)b_H(x)]x^m \mod g(x)$ includes:
  i. a register for holding coefficients of $a_H(x)b_H(x)=V(x)$ as $V_L V_H$, where $V_H=v_{n-2}x^{(n-2)-(m+1)}+ \ldots +v_{m+1}$, and $V_L=v_m x^m+ \ldots +v_1 x^1+v_0$;

ii. a plurality of shift registers for cyclically shifting n-bit symbols that include the m+1 coefficients of $V_H$ followed by m all-zero symbols by, respectively, m−$j_i$ where $j_i$ is the power of the $i^{th}$ non-zero term of generator polynomial g(x) for i=k−2, k−1, ... , 1 and k is the number of non-zero coefficients in the generator polynomial; and iii. a plurality of Galois field adders for adding together the contents of the register and the plurality of shift registers.

6. The Galois field multiplier of claim 4 wherein the means for determining $[x^2(a_H(x)b_H(x))x^m \mod g(x)+x(b_H(x)a_L(x))+x(a_H(x)b_L(x))]x^m \mod g(x)$ includes:
  i. a register for holding coefficients of $x^2(a_H(x)b_H(x))x^m \mod g(x)+x(b_H(x)a_L(x))+x(a_H(x)b_L(x))=C(x)$ as $C_L C_H$, where $C_H x^m=(0+c_{n+2}x^{(n-2)-m}+ \ldots +c_{m+1}x+c_m)x^m$ and $C_L=c_{m-1}x^{m-1}+ \ldots +v_1 x^1+v_0$;

ii. a plurality of shift registers for cyclically shifting n-bit symbols that include the m coefficients of $C_H$ followed by m all-zero symbols by, respectively, m−$j_i$ where $j_i$ is the power of the $i^{th}$ non-zero term of generator polynomial g(x) for i=k−2, k−1 ... 1 and k is the number of non-zero coefficients in the generator polynomial; and iii. a plurality of Galois field adders for adding together the contents of the register and the plurality of shift registers.

* * * * *